Sept. 24, 1968
A. R. JANEIRO
3,402,474
WAIST MEASUREMENT GAUGE
Filed Jan. 4, 1967
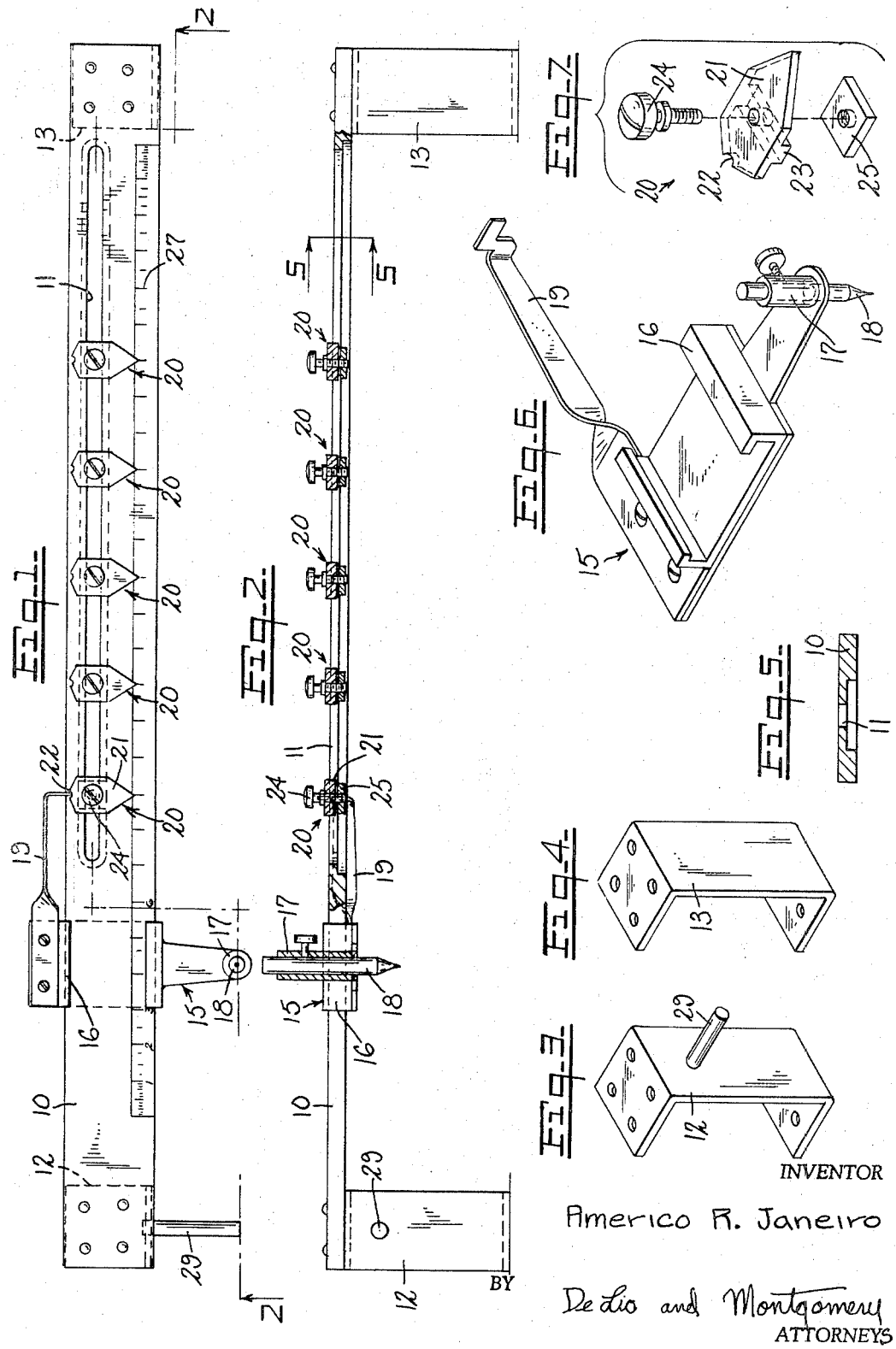
INVENTOR
Americo R. Janeiro
BY De Lio and Montgomery
ATTORNEYS

United States Patent Office 3,402,474
Patented Sept. 24, 1968

3,402,474
WAIST MEASUREMENT GAUGE
Americo R. Janeiro, 12 Horse Pond Road,
Madison, Conn. 06443
Filed Jan. 4, 1967, Ser. No. 607,871
4 Claims. (Cl. 33—189)

ABSTRACT OF THE DISCLOSURE

This invention relates to a gauging apparatus for measuring the length of cloth required to make the waist bands for wearing apparel such as slacks. In particular, the gauge of this invention comprises in combination, a bar having a slot therein, a scriber assembly supported by and movable on said bar, mounting means for supporting the bar on a surface, spring detent means supported by said scriber assembly, a pin supported by said mounting means, selector assembly means having notch means therein, said selector assembly means supported by said bar and movable within the slot formed in the bar, said notch and said spring detent means cooperating to position the scriber assembly.

---

This invention relates to a gauge for measuring the waist band of wearing apparel such as slacks.

In the past, many types of gauging devices for measuring waist bands have been designed, but none of these has proven itself under manufacturing conditions found in the garment industry.

Accordingly, it is an object of this invention to provide a new and improved gauge for use in the garment industry.

Other objects and advantages of this invention will hereinafter become more fully apparent from the following description of the drawings, which illustrate a preferred embodiment thereof, and wherein:

FIG. 1 is a top view of the waist measurement gauge according to this invention;

FIG. 2 is a partial sectional view taken along line 2—2 of FIG. 1;

FIG. 3 is a perspective view showing one support of the gauge of this invention;

FIG. 4 is a perspective view showing the other support according to the invention;

FIG. 5 is a sectional view taken along line 5—5 of FIG. 2;

FIG. 6 is a perspective view showing the scriber and spring detent, according to the invention; and FIG. 7 is a perspective view showing the selector assembly according to the invention.

Referring to the FIGURES 1–7 in general, the gauge includes a bar 10 having a guide slot 11 formed therein. The bar 10 is supported at both ends by mounting members 12 and 13, such that the gauge may be mounted on a work table or the like. Slidably positioned on the bar 10 is a movable scriber or marker assembly 15 comprising a flanged member 16 overlying the bar 10 and a holder member 17 for supporting a marker 18, such as a crayon, pencil, or the like. Also supported by the marker assembly is a spring detent 19 which cooperates with measurement selector assemblies shown at 20 to set the position of the marker 19. The selector assemblies 20 each comprise a pointer member 21 having a notch 22 which co-operates with the spring detent, as shown in FIG. 1. The pointer member also includes a keyway 23 which rides within the slot 11 in the bar 10. The pointer member 21 is securely positioned in place on the bar by a cooperating thumbscrew 24 and nut 25. In order to lock the position of the selector assemblies 20 with respect to the bar 10, there is provided a ruler 27 mounted on the bar 10.

There is also provided a pin 29 which is supported by the member 12. The pin is used to position one end of the cloth to be measured by the gauge.

In order to use the gauge to measure the waist band of a pair of trousers or slacks, the selector assemblies 20 are positioned at various points along the ruler 27, corresponding to the waist size desired. For example, to make a 22½ inch waist band, one of the selector assemblies 20 is positioned at 11¼ inches away from the pin 29. Thereafter the scriber assembly 15 is moved and the detent 19 is placed within the notch 22. The remainder of the selector assemblies 20 may also be positioned to make other sizes of waist bands and the thumb screws 24 can be marked on the top thereof to indicate other waist band sizes. Thereafter, the marker 18 should be positioned such that it is on the same level as the pin 29. At this time, the trousers to be measured are hooked together at the front (i.e. by the use of the hook and eye or the button at the top of the fly), the fly is then zippered and the fly portion positioned around the pin 29. Thereafter, the marker 18 is used to mark the measurement desired for the waist band, such that a sewer may close up or seam the back of the trousers.

Having thus completely and fully described this invention, what is now claimed as new and desired to be protected by Letters Patent of the United States is:

1. A gauge comprising in combination a bar, mounting means for supporting the bar, a pin supported by the mounting means, a movable scriber assembly supported by said bar for movement along the bar, a spring detent coupled to said scriber assembly, a selector assembly supported by the bar and having a notch formed therein, said notch cooperating with said spring detent to position said scriber assembly with respect to said pin.

2. A gauge according to claim 1, wherein said bar includes a slot and wherein said selector assembly includes a thumbscrew and nut, said thumbscrew passing through said slot to engage the nut on the other side of said slot.

3. A gauge according to claim 2, wherein said selector assembly includes a key portion positioned within said slot.

4. A gauge according to claim 1, wherein the scriber assembly includes a flanged member and a marker holder.

References Cited

UNITED STATES PATENTS

| | | | |
|---|---|---|---|
| 517,696 | 4/1894 | Hunter | 33—158 |
| 750,221 | 1/1904 | Reis | 33—42 |
| 1,404,794 | 1/1922 | Reitenbaugh | 33—27 |
| 2,000,866 | 5/1935 | Smith | 33—191 |
| 2,303,024 | 11/1942 | Clark | 33—27 |

FOREIGN PATENTS 22,422    1893    Great Britain.

HARRY N. HAROIAN, *Primary Examiner.*